INVENTOR
S. J. BUCHSBAUM
ATTORNEY

United States Patent Office 3,554,636
Patented Jan. 12, 1971

3,554,636
OPTICAL MODE FILTER EMPLOYING A COLLOIDAL SUSPENSION
Solomon J. Buchsbaum, Westfield, N.J., assignor to Bell Telephone Laboratories, Incorporated, Murray Hill and Berkeley Heights, N.J., a corporation of New York
Filed Dec. 4, 1967, Ser. No. 687,689
Int. Cl. G02b 5/20
U.S. Cl. 350—311                                              1 Claim

ABSTRACT OF THE DISCLOSURE

In an optical mode filter, colloidal conductive needles of high aspect ratio are axially oriented and suspended in a transparent medium. The medium may be a liquid; and the needles may be magnetic. In this case, the needles may be axially oriented by an applied magnetic field.

BACKGROUND OF THE INVENTION

This invention relates to an optical mode filter. An optical mode filter is a device that passes a selected optical mode with relatively little attenuation and attenuates all other optical modes to a much greater degree.

Recent theoretical and experimental studies of optical transmission systems with periodic focusing have shown that the presence of aberrations, either random or regular, in a system of lenses converts energy from the lowest Gaussian mode into higher modes. Typically, it is the lowest Gaussian mode that is launched in an optical guide; and the conversion of a portion of the energy to higher modes is detrimental to optical communication. Thus, it is desirable that a way be provided for selectively attenuating the energy in all but the lowest order mode.

SUMMARY OF THE INVENTION

According to my invention, I have recognized that a medium whose conductivity at optical frequencies is large for axial electric fields and small for transverse electric fields will preferentially attenuate the higher modes. All higher order modes are characterized by nodes in intensity of the electric field at some intermediate radius within the transmission path or guide. Near those values of radius, the axial electric field is relatively large. For each such higher order mode, the ratio of its axial electric field to its transverse electric field is much greater than the comparable ratio for the lowest Gaussian mode. Therefore, if all components of axial electric field can be made to induce currents that dissipate the energy of the axial electric fields, the higher order modes will be attenuated to a much greater degree than the lowest Gaussian mode.

According to one feature of my invention, a medium suitable for such an optical mode filter comprises conductive needles in the form of a colloidal suspension; the needles are axially oriented within the optical guide. They introduce loss predominantly for those components of electric field which are parallel to their long dimension.

According to a further feature of my invention, the suspending medium is a transparent liquid and the needles are magnetic. They are axially oriented by an applied magnetic field.

By "needles," I mean elongated particles whose length is of the order of the light wavelength or larger, for example, approximately one micron, and whose transverse dimensions are much smaller than the light wavelength, for example, 50 to 100 angstrom units. One micron equals 10,000 angstrom units. Therefore, the desirable aspect ratio of such needles would be about 100 to 1. Magnetic needles of this type can be made from iron or other suitable ferromagnetic material.

BRIEF DESCRIPTION OF THE DRAWINGS

Further features and details of the present invention will be explained in the following detailed description, taken together with the drawing, in which.

DESCRIPTION OF ILLUSTRATIVE EMBODIMENT

Figure 1:
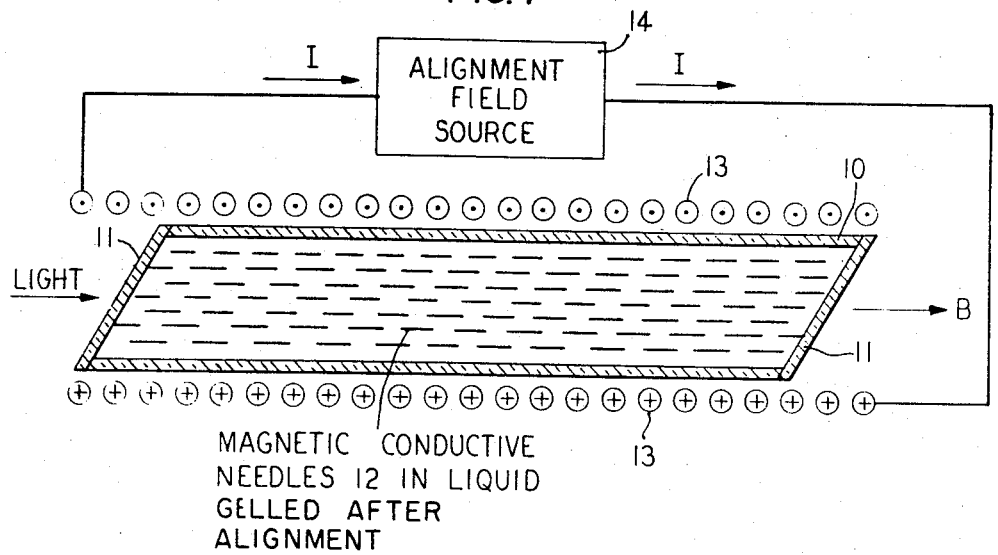
FIG. 1 is a partially pictorial and partially schematic illustration of a preferred embodiment of my invention.

In the apparatus of FIG. 1, light carrying information modulation is incident from the left after transmission through the atmosphere or a light guide in either of which periodic focusing occurred. Although the modulated light was originally transmitted in the lowest Gaussian mode, the periodic refocusing has produced higher order modes which impair the communication capacity of the system.

The optical mode filter comprises a cell having cylindrical walls 10 and Brewster angle entrance and exit faces 11. Within the cell, iron colloidal needles 12 are suspended in highly purified water. The needles 12 are axially oriented, that is, oriented parallel to the light propagation direction, by the application of an axial magnetic field, B. This field is produced by current flowing through a coil 13 which is wrapped around the cell and connected to an alignment field source 14. The coil 13 is shown in cross section; and a dot in the center of the conductor represents current flowing out of the paper while a plus sign in the center of the conductor represents current flowing into the paper.

The length of the assembly along the direction of propagation of the light is illustratively about 15 centimeters. The average concentration of the iron particles is illustratively 1 percent by volume in the water suspension, which fills the cell. The aspect ratio of the needles is illustratively 100 to 1. That is, they are approximately one micron long and 100 angstrom units in their largest transverse dimension. Such needles may be made by any of the conventional methods for producing fine iron filings. The presence of a few needles somewhat larger or smaller than the desired value does not substantially impair the operation of the invention. The magnetic flux density, B, supplied by coil 13 is illustratively 600 oersteds.

More generally, the aspect ratio of the needles may lie in the range from about 30 to 1 up to about 1,000 to 1, or even greater, although it is somewhat difficult to produce such needles. The average concentration of the needles by volume within the cell, or light supporting means, may range from 0.01 percent to 10 percent.

It should be apparent that a number of transmissive liquids could be used as the suspending medium. For example, the polyfluorinated heptane $C_7F_{16}$ is highly transmissive throughout most of the visible portion of the spectrum and would be highly suitable in that region. Moreover, a colloidal gel could be used as the suspending medium. The conductive needles would first be aligned in the medium while liquid and then frozen into position as the suspending medium solidified. Such an arrangement would have the adavntage that a continuing field would not need to be applied. Also, other magnetic materials, such as cobalt, can be formed into suitable needles and aligned by a magnetic field. Nonmagnetic conductive needles could also be employed if suitable means, such as an ultrasonic field or an electric field or strong current conduction through the suspension, is available for aligning them.

In operation, the multimode modulated light enters the cell through one of the Brewster angle faces 11 and propagates through the suspension including the conductive needles 12. To understand how the relative attenuation of various modes occurs, it is important to note that the wavefront propagating through the gel is not a plane wave. Even the lowest Gaussian mode has a curved wavefront. While it is well known that a plane wave has no axial components of electric field, a curved wave front must have some nonzero component, $E_z$, of electric field.

This principle follows from the divergence equation for the electric field in a region of zero charge. Thus, $$\nabla \cdot \overline{E} = 0 \quad (1)$$

or $$\frac{\partial E_y}{\partial y} + \frac{\partial E_x}{\partial x} + \frac{\partial E_z}{\partial z} = 0 \quad (2)$$

One of the foregoing partial derivatives is zero, for example, the $E_x$ component, if the incident light is linearly polarized in the orthogonal coordinate, for example, in the $y$ direction. Thus, the gradient, $\partial E_z/\partial z$, of the axial electric field in the axial direction is nonzero and equal to the negative of the gradient, $\partial E_y/\partial y$, of the transverse electric field, $E_y$ in the $y$ direction.

My invention depends, for its operation, upon the fact that for the higher order modes, $\partial E_y/\partial y$ is much greater, relative to the initial magnitude of $E_y$, at certain radial, or $y$ positions, within the cell than the corresponding $\partial E_y/\partial y$ is at any point for the lowest order Gaussian mode in relation to its $E_y$.

Figure 2:
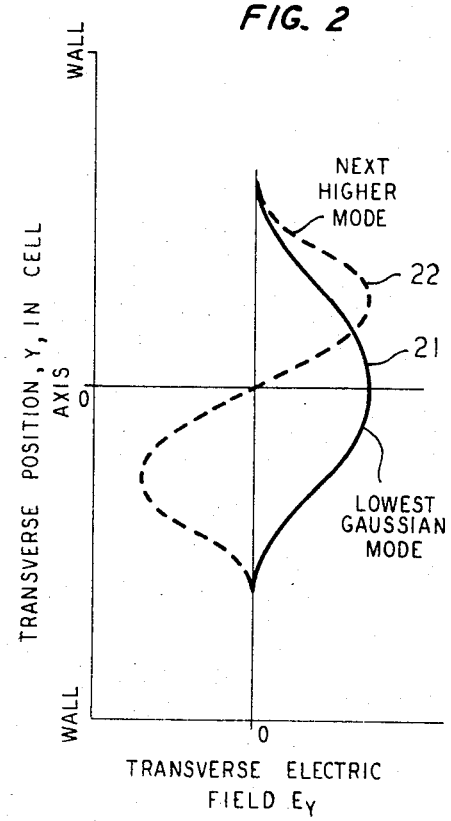
FIGS. 2 and 3 show curves which are useful in explaining the theory and operation of my invention.
Figure 3:
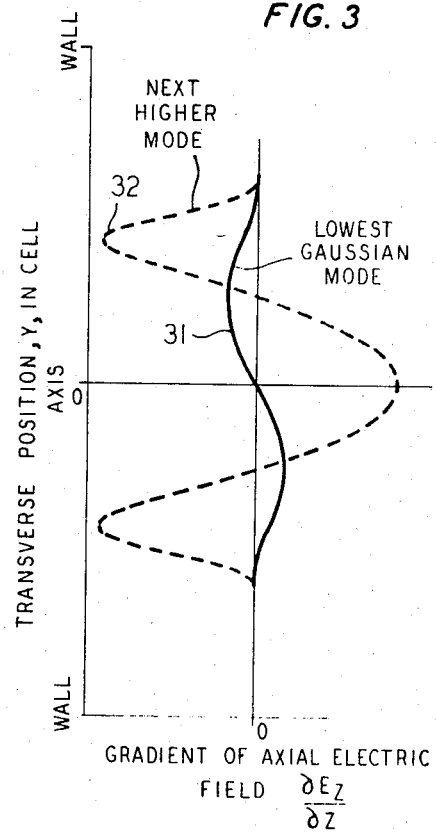

This fact may be more readily perceived from the curves of FIG. 2 and FIG. 3. The transverse electric field distribution for the lowest order Gaussian mode is given by curve 21, while that for the next higher mode is given by curve 22. It may be seen that the $\partial E_y/\partial y$ values are much greater, relative to the absolute magnitudes of the peaks of the curves, for curve 22 than for curve 21. For simplicity of illustration, both curves have been drawn with the same peak magnitude in order to explain the relative effect, even though the higher order mode will generally have a smaller absolute magnitude than the lowest Gaussian mode. The corresponding gradients of axial electric field, $\partial E_z/\partial z$ are illustrated in FIG. 3 by curve 31 for the lowest Gaussian mode and by curve 32 for the next higher mode. The dissipative currents induced in conductive needles 12 are directly proportional to the square of the corresponding axial electric fields.

A much higher proportion of the energy of the higher modes will be dissipated in the needles by conductive heating than for the lowest Gaussian mode.

What is claimed is:
1. A mode filter for all but a selected transverse mode of a beam of optical electromagnetic wave energy, comprising
    means comprising an optical cell for supporting the propagation of said energy, said supporting means having a transverse dimension substantially greater than a wavelength of said energy, and
    means for attenuating axial components of electric field of the nonselected modes, said attenuating means including
    a gellable liquid transparent to said energy disposed in said optical cell,
    substantially dissipative colloidal particles suspended in said liquid, said particles comprising iron filings selected to have their largest transverse dimensions predominantly much smaller than a wavelength of the optical wave energy, said filings having an aspect ratio greater than 30:1 and an average concentration in the range from 0.1 percent to 10 percent by volume within the supporting means, and
    means for applying a magnetic field to the liquid and said filings to orient the long dimensions of the filings substantially along the axis of the supporting means.
    said liquid being gelled after said filings are oriented along said axis.

References Cited
UNITED STATES PATENTS
| | | | |
|---|---|---|---|
| 1,963,496 | 6/1934 | Land | 350—267 |
| 3,328,110 | 6/1967 | Berger et al. | 350—161X |
| 2,577,619 | 12/1951 | Kock | 343—753 |
| 2,579,324 | 12/1951 | Kock | 343—911 |
| 3,257,903 | 6/1966 | Marks | 350—150UX |

DAVID SCHONBERG, Primary Examiner

T. H. KUSMER, Assistant Examiner

U.S. Cl. X.R.

350—163